United States Patent Office 2,818,439
Patented Dec. 31, 1957

2,818,439

OLEFIN HYDRATION PROCESS USING HALOGENATED CYCLIC AROMATICS

Thomas H. Hakala and Isidor Kirshenbaum, Union, N. J., assignors to Esso Research and Engineering Company, a corporation of Delaware No Drawing. Application September 1, 1955
Serial No. 532,105

7 Claims. (Cl. 260—614)

The present invention relates to an improved olefin hydration process. It is more particularly concerned with an olefin hydration process wherein a halogenated aromatic hydrocarbon is added in at least inhibiting amounts to the reactants whereby formation of undesirable color bodies is substantially suppressed and yield of polymer by-product is reduced.

In a preferred application, a halogenated aromatic hydrocarbon is used not only to inhibit color body formation during the hydration of olefins but also is used in an amount sufficient to serve as a cosolvent to extract the hydration products, preferably the ethers, whereby formation of undesirable polymers is substantially reduced or in many cases eliminated. This invention is particularly concerned with an improved process for the manufacture of diisopropyl ether which comprises absorbing in an absorption zone propylene in sulfuric acid having an acid strength in the range of 65 to 70 wt. percent on a hydrocarbon free basis at a temperature in the range of 190 to 250° F. and a pressure in the range of 100 to 500 p. s. i., simultaneously extracting the ether formed thereby with an ether selective solvent in the presence of up to 50 wt. percent, based on total solvent, of a chlorinated single ring aromatic hydrocarbon, and recovering diisopropyl ether from the solvent.

Although it is preferred to extract the hydration products simultaneously with the absorption of the olefin, the extraction can be carried out in an extraction zone separate from the absorption zone.

The olefin hydration processes to which this invention has applicability are those known in the art, such as the hydration of ethylene, propylene, butenes and higher unsaturates, using a strong acidic catalyst, to form ethers and alcohols. For example, it has become conventional to hydrate ethylene by first absorbing it in sulfuric acid having an acid strength in the range of 90 to 100 wt. percent $H_2SO_4$ to obtain an acid extract containing about 1.0 to 1.5 moles of ethylene per mole of 100% $H_2SO_4$. This acid extract is then diluted to an acid strength of about 40 to 50% and hydrolyzed. Alcohols and ethers are then stripped therefrom at a temperature in the range of 105 to 120° C. and a pressure in the range of 0 to 25 p. s. i. The lean acid remaining from this stripping is then reconcentrated to the desired acid strength and recycled to the absorption zone to repeat the cycle.

It is also known in the art, to hydrate propylene by first absorbing it in sulfuric acid having a strength in the range of 65 to 70 wt. percent at a temperature in the range of 70 to 90° C. and a pressure in the range of about 75 to 500 p. s. i. to obtain an acid extract containing 0.8 to 2.0 moles of propylene per mole of 100% $H_2SO_4$. This acid extract is then heated in a separate ether generation zone at a temperature in the range of 100 to 120° C. and at a pressure in the range of 0 to 50 p. s. i. to recover diisopropyl ether and isopropyl alcohol. The lean acid extract is then returned to repeat the cycle. Water may be added to the acid extract either before or after generation of the ether and alcohol.

Butylenes may be similarly hydrated under select conditions of acid strength and temperature.

It is also known to hydrate higher molecular weight olefins such as diisobutylene, hexenes, cyclohexenes, heptenes and cetenes by reacting the olefins with perfluoro acids, e. g., perfluoro acetic acid, to produce the corresponding perfluoro esters and alcohols.

Instead of using a strong acidic liquid catalyst, resin catalysts such as polystyrene sulfonic acid may be used to form ethers. In this type of process, the reaction mixture is passed over the catalyst at least partially in liquid phase, usually at a temperature in the range of 250 to 350° F. and at a pressure in the range of 500 to 3000 p. s. i.

More recently, it has been proposed to employ a selective solvent when using sulfuric acid catalyst to recover the ether and/or alcohol formed by the hydration of an olefin. Thus a solvent, preferably an aromatic hydrocarbon, e. g. xylenes, is used to extract the hydration products, preferably the ethers, either concurrently with the absorption of the olefin or from the acid extract in a separate extraction or recovery zone. The solvent containing the extracted hydration products is processed as by stripping or fractionation to recover the hydration products and solvent. The recovered solvent is returned to the absorption zone or extraction zone, as the case may be, to repeat the cycle.

It has been found desirable to use an ether-selective solvent, either concurrently with the absorption of the olefin in sulfuric acid or during heat soaking of the acid extract obtained by the absorption, because ether is selectively removed from solution as it is formed which thereby favorably influences the equilibrium reaction, permitting the formation of more ether. Instead of obtaining ether yields of about 13% per pass as is conventional in a propylene hydration process, the use of a solvent permits yields over 50 mole percent per pass or higher.

In all of the above processes, undesirable color bodies form and cause complications such as contamination of the product or make separation of the products difficult. Also, in many cases, a substantial proportion of the olefin feed is converted to heavy polymers, which is uneconomical, and in the cases where solvents are used, complicates the separation procedures.

It has now been found that halogenated aromatic hydrocarbons exert a beneficial inhibiting action in olefin hydration processes as above described. More particuly, it has been found that when used in minor amounts mixed with the reactants such halogenated compounds substantially suppress or eliminate formation of undesirable color bodies. While the halogenated aromatics are broadly useful in any hydration process, it is particularly preferred, according to this invention, to use them in a hydration process wherein an ether selective solvent is used to recover the ether product.

When used in amounts sufficient to serve as a cosolvent with conventional solvents, it has been found that not only is color body formation suppressed, but that polymer yields are substantially suppressed and in many cases eliminated.

In the processes utilizing a resin catalyst such as polystyrene sulfonic acids, this invention may be practiced by halogenating the aromatic rings of the catalyst.

This desirable inhibiting effect of halogenated aromatic hydrocarbons is most pronounced in steel and iron reactors conventially used in industry but also is of value in reactors employing other materials of construction, e. g., lead, chrome, nickel, and silicon alloys.

It would be expected that the polar nature of the halogenated aromatic hydrocarbons when used as an inhibitor or cosolvent would increase ether yields, but it was found surprisingly enough that they displayed no advantage in this respect over other types of ether or alcohol selective solvents such as single ring aromatics. It was surprisingly found, however, that the halogenated aromatic hydrocarbons exerted a substantial and very beneficial effect in suppressing color body and polymer formation during the hydration of olefins.

The compounds that serve as inhibitors and/or co-solvents in olefin hydration processes according to the present invention are mono- or poly-halogenated aromatic hydrocarbons which may have alkyl, sulfonic, methoxy and phenyl substitute groups. Such aromatic hydrocarbons comprise, for example, halogenated benzenes, naphthalenes, and tetralins. Typical of these halogenated aromatic hydrocarbons are chlorobenzene, chlorotoluene and chloronaphthalene.

Preferred compounds are mono- or poly-chlorinated or brominated aromatics, which may have alkyl substitute groups, such as p-chlorotoluene and p-bromotoluene. Excellent results are obtained with chloro and dichlorobenzene. Especially preferred are chlorinated single ring aromatics.

Conventional solvents that may be used as cosolvents with the halogenated aromatics of this invention include, for example: aromatics such as benzene, substituted benzenes, naphthalene and substituted naphthalenes; naphthenic hydrocarbons such as decalin and substituted cycloalkanes; aliphatics such as n-decane and cetane; and ethers such as diphenyl and phenyl methyl ether. The solvent may, of course, comprise mixtures of such hydrocarbons. For example, naphthas or kerosenes from the distillation of crude oils make suitable solvents.

Aliphatic halides such as $CHCl_3$ cannot be used in the present invention because of azeotropes formed with the hydration products. $CHCl_3$, for example, azeotropes with diisopropyl ether to form a maximum boiling mixture containing 36% $CHCl_3$. Similarly, $CCl_4$ forms an azeotrope with isopropyl alcohol boiling at 69° C., which is also the boiling point of diisopropyl ether. Higher molecular weight aliphatic halides, such as 2,2 dichloropropane, also azeotrope with the ether and alcohol.

In the case of ethylene hydration, the use of a halogenated aromatic would not be desirable, because it may undergo sulfonation. In this application, it is preferred to use a halogenated, sulfonated aromatic such as p-chlorobenzene sulfonic acid.

When used as an inhibitor, 1 to 25 mole percent, preferably 5 to 15 mole percent, based on olefin feed, of a halogenated aromatic is used. Below this range low efficiencies are obtained. When used as a cosolvent, the halogenated aromatic comprises up to 50 wt. percent, preferably 5–35%, of the solvent. Above 50 wt. percent, efficiency of the cosolvent for ether removal decreases.

In process using resin catalyst, 0.5 to 15 mole percent, preferably 1 to 10 mole percent, based on olefin feed, is used. Efficiency falls off below this range, and above this range conversion decreases and plant size is unnecessarily increased.

The halogenated aromatic hydrocarbon used may be recovered from the reaction products by conventional means including distillation and stripping. When a solvent is not used to recover the hydration products, it is preferred to use an aromatic hydrocarbon that is non-volatile under the conditions of recovery and to recover the products from the acid extract such that the inhibitor, i. e., the halogenated aromatic, remains in the acid phase.

The following Tables I and II will serve to make this invention more explicit. The tables present preferred ranges of conditions and examples of solvent processes for producing diisopopyl ether using a chlorinated aromatic hydrocarbon, such as p-chlorotoluene, as an inhibitor and as a cosolvent. Table I describes a process wherein the absorption of propylene and extraction of ether are simultaneously carried out in zone. Table II describes a process using the same solvent wherein the extraction of ether from the acid extract is carried out in a zone separate from the absorption zone. In each case, the absorption zone used may be a conventional zone such as a vertically elongated tower filled with packing such as Raschig rings, bubble caps, etc., or a tower wherein mixing is positively provided by a mechanical means. In Table I, is it assumed that both ether and alcohol are recovered and in Table II, the alcohol is recycled to increase the yield of ether.

TABLE I

| | Preferred Range | Example as Inhibitor | Example as Co-solvent |
|---|---|---|---|
| Propylene Pressure, p. s. i. | 100 to 250 | 130 | 130 |
| Temperature, °F | 190 to 250 | 230 | 230 |
| Acid strength, H–C free basis, wt. percent. | 65 to 70 | 69 | 69 |
| 100% propylene feed rate, moles/mole 100% $H_2SO_4$/Hr. | 0.5 to 3 | 1.4 | 1.4 |
| Solvent [1], wt./wt. 100% $H_2SO_4$ | 0.5 to 2 | 1.5 | 1.5 |
| P-chlorotoluene, percent of total solvent. | 5 to 35 | 10 | 35 |
| Average solvent residence time, min. | 30 to 120 | 60 | 60 |
| Propylene conversion, mole percent of propylene feed per pass. | 60 to 95 | 63 | 63 |
| Ether yield, moles/mole propylene converted. | 0.80 to 0.95 | 0.90 | 0.88 |
| Alcohol yield [2], moles/mole propylene converted. | 0.04 to 0.10 | 0.07 | 0.08 |

[1] Comprising xylenes and p-chlorotoluene.
[2] No recycle of alcohol.

TABLE II

| | Preferred Range | Example as Inhibitor | Example as Co-solvent |
|---|---|---|---|
| Absorption zone: | | | |
| Pressure, p. s. i. | 75 to 500 | 300 | 300 |
| Temperature, °F | 160 to 195 | 170 | 170 |
| Acid strength, H–C free basis. | 65 to 70 | 67 | 67 |
| Average acid residence time, min. | 0.5 to 2.0 | 1.0 | 1.0 |
| 100% propylene feed rate, moles/mole 100% $H_2SO_4$. | 1.2 to 1.6 | 1.4 | 1.4 |
| Moles propylene/mole 100% $H_2SO_4$ in acid extract. | 1.1 to 1.9 | 1.5 | 1.5 |
| Extraction Zone [1]: | | | |
| Pressure, p. s. i. | 20 to 200 | 32 | 34 |
| Temperature, °F | 195 to 230 | 212 | 212 |
| Vol. of solvent/vol. of acid extract. | 0.5 to 3 | 1 | 1 |
| P-chlorotoluene, percent of total solvent. | 5 to 35 | 10 | 35 |
| Average residence time of solvent and acid extract. | 30 to 180 | 120 | 120 |
| Ether yield, moles/mole propylene converted. | 0.8 to 0.95 | 0.94 | 0.92 |
| Polymer yield, mole percent propylene converted. | 0.005 to 0.02 | 0.01 | 0.008 |

[1] With 100% recycle of alcohol to extraction zone.

Example I (Comparative)

The following Table III compares this invention, when a halogenated aromatic hydrocarbon is used simply as an inhibitor to suppress color body formation, to previously proposed processes for the production of diisopropyl ether using sulfuric acid as a catalyst. In all three cases, an acid extract was prepared by absorbing propylene in sulfuric acid of 67 wt. percent acid strength at a pressure of 200 p. s. i. and a temperature of 170° F. to obtain an acid extract containing 1.45 moles of propylene per mole of 100% $H_2SO_4$. In the case of column 1, this acid extract was then heated at a temperature of 212° F. at atmospheric pressure for a time of 60 min. to distill off the ether. In the case of column 2, the acid extract was mixed with a xylene solvent. The solvent was then separated from the lean acid extract remaining and the solvent was stripped to recover the ether in a separate zone. In the case of column 3, xylene containing 10% chlorobenzene was mixed with the acid extract separated and the ether recovered by stripping. In all cases, the alcohol recovered during the stripping was recycled to the ether extraction zone in the case of columns 2 and 3, or to the ether regenerator zone in the case of column 1. Table III shows the marked improvement in color obtained by this invention.

TABLE III

|  | Conventional (no solvent) 1 | Conventional (with solvent) 2 | This Invention 3 |
|---|---|---|---|
| Pressure, p. s. i. g. | 0 | 35 | 31 |
| Temperature, °F. | 212 | 212 | 212 |
| Average residence time of acid extract, min. | 60 | 60 | 60 |
| Total ether produced, moles/mole propylene converted | 10 | 20 | 19 |
| Solvent, wt. percent of acid extract | | [1] 73 | [2] 74 |
| Color of spent acid extract | dark amber | dark amber | water white |

[1] Mixed xylenes.
[2] Comprising 10 wt. percent chlorobenzene and 90 wt. percent mixed xylenes.

*Example II*

The following Table IV illustrates the advantage of using a halogenated aromatic such as dichlorobenzene as a cosolvent to extract ether from acid extracts as compared to other non-halogenated solvents. In all cases, the acid extract used had an acid strength of 65 wt. percent on a hydrocarbon free basis and contained 1.4 moles of propylene per mole of 100% $H_2SO_4$. 100 vol. percent of the solvent per vol. of acid extract was mixed with the extract to accomplish recovery of diisopropyl ether. The solvent containing the ether was then separated from the acid extract and stripped to recover the ether.

TABLE IV

| Solvent | Polymer yield [1] | Ether yield [1] | Product color |
|---|---|---|---|
| 100% mixed xylenes | 1-3 | 18 | Dark amber. |
| 70% mixed xylenes, 30% chlorobenzene. | <1 | 17 | Water white. |

[1] Percent of propylene feed.

It can be seen that the amount of polymer appearing in the solvent phase was substantially reduced or eliminated when a chlorinated aromatic hydrocarbon is used as a cosolvent, and the color of the lean acid extract (separated from the solvent) was water white instead of colored which indicates that detrimental color bodies were not formed.

When halogenated aromatic hydrocarbons are used per se as solvents, inferior results are obtained. As shown in Table V, chlorobenzene is a poor solvent for ether as compared to the xylenes or decalin. The data were obtained in the same manner as those in Table IV.

TABLE V

| Solvent | Polymer yield [1] | Ether yield [1] | Product color |
|---|---|---|---|
| Mixed xylenes | 1-3 | 18 | Light to dark amber. |
| Decalin | 4.6 | 16 | Dark amber. |
| None | 1-3 | 10 | Do. |
| Chlorobenzene | <1 | 14 | Water white. |

[1] Percent of propylene feed.

*Example III*

A non-halogenated polar organic compound, p-toluene sulfonic acid, was added to a xylene solvent in a weight ratio of 1.5/100 xylene. The resulting mixture was used under the conditions given in Table III, column 3. A marked increase in polymer yield (7%), was obtained with a decreased ether yield (16%), as compared to 20% ether and 1% polymer yield when a xylene solvent alone was used and 19% ether yield, for the xylene-chlorotoluene solvent. The acid extract was very dark, almost black, as compared to the colorless extract obtained when this invention is practiced. This illustrates the uniqueness of the halogenated aromatics in decreasing polymer yield, and shows that mere polarity of the solvent is not responsible for the improved results.

*Example IV*

To demonstrate the use of this invention in a resin catalyst process, a gas containing 95 vol. percent propylene, along with 0.6/1 moles of water/mole of propylene, was passed over a polystyrene sulfonic acid catalyst at 1000 p. s. i. g., 300° F., and a rate of 0.4 vol./hr./vol. of catalyst. The catalyst had 8% cross linkage. With 1% chlorobenzene added to the feed, a conversion of about 60%, based on 100% propylene feed, was obtained with an ether selectivity (moles ether/mole propylene converted) of about 65%. Polymer yields were lower than in a similar run without the use of a halogenated aromatic.

Having described this invention, what is sought to be protected by letters patent is succinctly set forth in the following claims.

What is claimed is:

1. In a process wherein a $C_2$ to $C_4$ olefin is hydrated at elevated temperature and pressure in the presence of a strongly acidic catalyst for a period sufficient to form the corresponding ether and alcohol and said ether and alcohol are extracted with an ether-selective hydrocarbon solvent, the improvement which comprises adding to the reaction zone at least 1 mole percent, based on the olefin feed, and up to 30 weight percent, based on the total solvent, of a halogenated one to two ring aromatic hydrocarbon selected from the group consisting of mono- and di-chlorinated aromatic hydrocarbons, lower alkyl substituted mono- and di-chlorinated aromatic hydrocarbons, mono- and di-brominated aromatic hydrocarbons, and lower alkyl substituted mono- and di-brominated aromatic hydrocarbons.

2. A process according to claim 1 wherein the halogenated aromatic hydrocarbon comprises between 5 and 35 weight percent of the total solvent.

3. In a continuous process for converting propylene into diisopropyl ether comprising contacting said propylene with 65 to 70 weight percent sulfuric acid as a catalyst to form an acid-propylene extract containing 0.8 to 2.0 moles of absorbed propylene per mole of 100% sulfuric acid, promptly contacting said extract and recycle alcohol with an ether selective aromatic hydrocarbon solvent in an extraction zone at a temperature in the range of 190° to 250° F., a pressure in the range of 100 to 500 p. s. i., and an acid extract holding time of 30 to 120 minutes, and thereby providing sufficient heat soaking to convert the said acid extract into diisopropyl ether and propanol during the solvent extraction, the improvement which comprises using a chlorinated single-ring aromatic hydrocarbon containing no more than two chlorine atoms in said solvent extraction zone in an amount in the range of at least 1 mole percent, based on the propylene feed, and up to 50 weight percent, based on the total solvent.

4. A process according to claim 3 wherein the ether-selective solvent is xylene and said chlorinated aromatic comprises 5 to 35 weight percent of the total solvent.

5. A process according to claim 3 wherein said chlorinated aromatic is used in an amount in the range of 5 to 15 mole percent, based on the propylene feed.

6. A process according to claim 5 wherein said chlorinated aromatic is chlorobenzene.

7. In a process for the hydration of propylene into diisopropyl ether comprising contacting said propylene with water in the presence of a synthetic sulfonated copolymer of styrene and divinyl benzene in a recation zone at a temperature in the range of 250° to 350° F. and a pressure in the range of 500 to 3000 p. s. i. contacting the resulting product with xylene in an extraction zone, and recovering diisopropyl ether from said solvent, the improvement which comprises using chlorobenzene in said reaction zone in an amount in the range of 0.5 to 15 mole percent, based on the olefin feed.

References Cited in the file of this patent

UNITED STATES PATENTS 2,178,186   Oldershaw _____ Oct. 31, 1939